United States Patent
Foster

(12) 
(10) Patent No.: US 10,247,307 B2
(45) Date of Patent: Apr. 2, 2019

(54) INTERLOCKING COMPOSITE SEALS

(75) Inventor: Mike Foster, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 2465 days.

(21) Appl. No.: 12/727,401

(22) Filed: Mar. 19, 2010

(65) Prior Publication Data

US 2010/0237565 A1 Sep. 23, 2010

Related U.S. Application Data

(60) Provisional application No. 61/162,554, filed on Mar. 23, 2009.

(51) Int. Cl.
| | |
|---|---|
| *F16J 15/16* | (2006.01) |
| *F16J 15/3208* | (2016.01) |
| *F16J 15/3236* | (2016.01) |

(52) U.S. Cl.
CPC ........... *F16J 15/166* (2013.01); *F16J 15/164* (2013.01); *F16J 15/3208* (2013.01); *F16J 15/3236* (2013.01); *Y10T 29/49874* (2015.01)

(58) Field of Classification Search
CPC .... F16J 15/3208; F16J 15/3236; F16J 15/166; F16J 15/164
USPC ................ 277/377, 353, 551, 561, 564, 569
See application file for complete search history.

(56) References Cited

U.S. PATENT DOCUMENTS

| | | | | |
|---|---|---|---|---|
| 1,552,666 A | * | 9/1925 | Banbury | 277/369 |
| 2,076,747 A | * | 4/1937 | Salisbury | 277/377 |
| 3,477,730 A | | 11/1969 | Szcupak et al. | |
| 3,511,512 A | * | 5/1970 | Wheelock | 277/564 |
| 3,642,290 A | * | 2/1972 | Millsap | 277/551 |
| 4,268,045 A | * | 5/1981 | Traub | 277/589 |
| 4,566,702 A | * | 1/1986 | Traub | 277/589 |
| 4,595,206 A | * | 6/1986 | Holzer | 277/366 |
| 4,623,153 A | * | 11/1986 | Nagasawa | 277/551 |
| 5,163,692 A | * | 11/1992 | Schofield et al. | 277/436 |
| 6,076,645 A | * | 6/2000 | Winkelmann et al. | 192/85.54 |
| 6,173,961 B1 | * | 1/2001 | Martin | 277/353 |

(Continued)

FOREIGN PATENT DOCUMENTS

| | | |
|---|---|---|
| DE | 22 39 387 A1 | 2/1974 |
| EP | 1 598 579 A1 | 11/2005 |

(Continued)

OTHER PUBLICATIONS

Extended European Search Report dated Jun. 10, 2010 from corresponding European Application No. 10 003 006.3 (11 pages).

*Primary Examiner* — Eugene G Byrd

(74) *Attorney, Agent, or Firm* — Klein, O'Neill & Singh, LLP

(57) ABSTRACT

Seal assemblies and methods for forming them are described. Aspects of the seal assemblies include a seal ring made of a relative soft material supported by a specially configured backing ring made of a much higher modulus material, such as ferrous and non-ferrous metal or engineered plastic. The seal assemblies may optionally include a retaining ring to prevent slippage relative to the environment or housing in which they are placed and to prevent shuttling. The seal assemblies may also optionally include an energizer to alter the force generating by a sealing lip on the seal ring. The seal assemblies preferably include a rigid hoop ring to minimize shrinkage due to thermal cycling.

27 Claims, 13 Drawing Sheets

(56) References Cited

U.S. PATENT DOCUMENTS

| | | | |
|---|---|---|---|
| 6,367,812 B1* | 4/2002 | Reinhardt et al. | 277/572 |
| 6,502,682 B2* | 1/2003 | Koschmieder et al. | 192/85.54 |
| 6,543,786 B2* | 4/2003 | Osumi et al. | 277/549 |
| 6,568,687 B2* | 5/2003 | Radosav | 277/389 |
| 6,641,141 B2* | 11/2003 | Schroeder | 277/552 |
| 6,736,403 B2* | 5/2004 | Kreutzer | 277/551 |
| 6,886,834 B2* | 5/2005 | Osako et al. | 277/558 |
| 7,344,140 B2* | 3/2008 | Ikeda | 277/572 |
| 8,096,559 B2* | 1/2012 | Cook | 277/353 |
| 8,328,202 B2* | 12/2012 | Foster et al. | 277/572 |
| 2002/0014747 A1* | 2/2002 | Yamada et al. | 277/619 |
| 2003/0111801 A1 | 6/2003 | Stephens | |
| 2007/0210529 A1* | 9/2007 | Kreutzer et al. | 277/551 |
| 2009/0146379 A1* | 6/2009 | Foster et al. | 277/307 |

FOREIGN PATENT DOCUMENTS

| | | |
|---|---|---|
| GB | 1 066 857 | 4/1967 |
| WO | WO 2007055156 A1 * | 5/2007 |

* cited by examiner

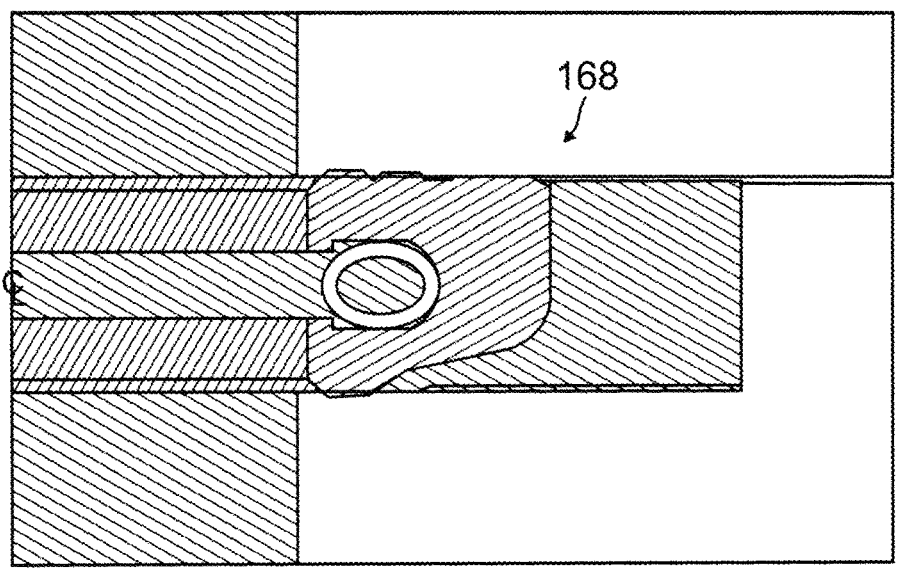
FIG. 12

170

Direction of Pressure →

INTERLOCKING COMPOSITE SEALS

CROSS-REFERENCE TO RELATED APPLICATION(S)

This is a regular utility application of provisional application Ser. No. 61/162,554, filed Mar. 23, 2009, the contents of which are expressly incorporated herein by reference. This application may also be related to U.S. patent application Ser. No. 12/329,405, filed Dec. 5, 2008, which is a regular utility application of provisional application Ser. No. 61/012,179, filed Dec. 7, 2007, which bears the title SEAL ASSEMBLY FOR HIGH PRESSURE DYNAMIC AND STATIC SERVICES. The contents of the two applications are expressly incorporated herein by reference for all purposes.

BACKGROUND

Seal assemblies are generally discussed herein for sealing a first environment or chamber from a second environment or chamber of a machinery or equipment with particular discussions extended to shaft seals in which a seal is retained within a housing on a shaft and a constant pressure is exerted by the seal on the shaft to maintain a dynamic seal between the shaft and the seal. Seal assemblies for use in static services are also discussed.

Seal assemblies for rotating, reciprocating, and face seal applications are well known in the art and are taught by, for example, U.S. Pat. Nos. 4,805,943; 4,830,344; 5,134,244; 5,265,890; 5,979,904; 5,984,316; 5,992,856; 6,050,572; 6,161,838; 6,264,205; and 6,641,141, the contents of each of which are expressly incorporated herein by reference.

Prior art polytetrafluoroethylene (PTFE) based seals are preferred by some because they provide flexibility, low-friction, and self-lubrication when used in sealing arrangements with a moving shaft, such as a rotating or reciprocating shaft. However, PTFE material used in making seals has a natural tendency to cold-flow and creep, especially in high temperature, pressure, and surface velocity applications, which are common in the oil and gas industry and other applications. Thus, operating life of PTFE-based seals is generally shorter than preferred when placed in these applications and conditions.

PolyEtherEtherKetone (PEEK) material, on the other hand, is better suited for high pressure, temperature and velocity applications. However, PEEK material is rigid and generally is not applicable or workable as a primary contact seal against moveable shafts, such as rotary or reciprocating shafts.

SUMMARY

An exemplary method of making a seal assembly having shrink resistant support is discussed herein. In one example, a method is described comprising providing a seal ring comprising a holding bore and an inside diameter; placing a first backing ring made from a high tensile strength material adjacent the seal ring and in contact with the seal ring, said first backing ring having a base section having a first thickness; placing a second backing ring adjacent to and in contact with the first backing ring; said second backing ring comprising a base section having a second thickness; and wherein the second thickness is at least three times thicker than the first thickness.

Another feature discussed herein is a seal assembly. In one example, a seal assembly is described comprising a rigid backing ring made of a first material having an axially extending flange; a seal ring positioned next to the backing ring and in mechanical engagement with the backing ring, placing a rigid hoop ring between the backing ring and the seal ring; said rigid hoop ring in contact with both the seal ring and the backing ring and has a tapered cone section that forms a line contact with the seal ring.

In yet another example, a seal assembly is provided having alternative features. For example, the seal assembly for sealing engagement with a shaft can include a seal ring comprising an outside flange, an inside flange, a center channel section, and a holding bore; a backing ring in adjacent contact with the center channel section and having a flange extending co-axially with the inside flange of the seal ring; wherein the inside flange further comprises a seal lip comprising an arcuate section overlapping an end edge of the flange of the backing ring; and wherein a metal rigid hoop ring is located between the seal ring and the backing ring.

Other examples are provided in the detailed description, drawings, and claims. Methods of making and using seal assemblies are also described.

BRIEF DESCRIPTION OF THE DRAWINGS

FIG. 12 is a cross-sectional view of seal assembly in accordance with an eleventh example.

DETAILED DESCRIPTION

The detailed description set forth below in connection with the appended drawings is intended as a description of the presently preferred embodiments of seal assemblies and methods related to seal assemblies and are not intended to represent the only forms in which the present invention may be constructed or utilized. The description sets forth the features and the steps for constructing and using the seal assemblies in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like or similar elements or features.

Figure 1:
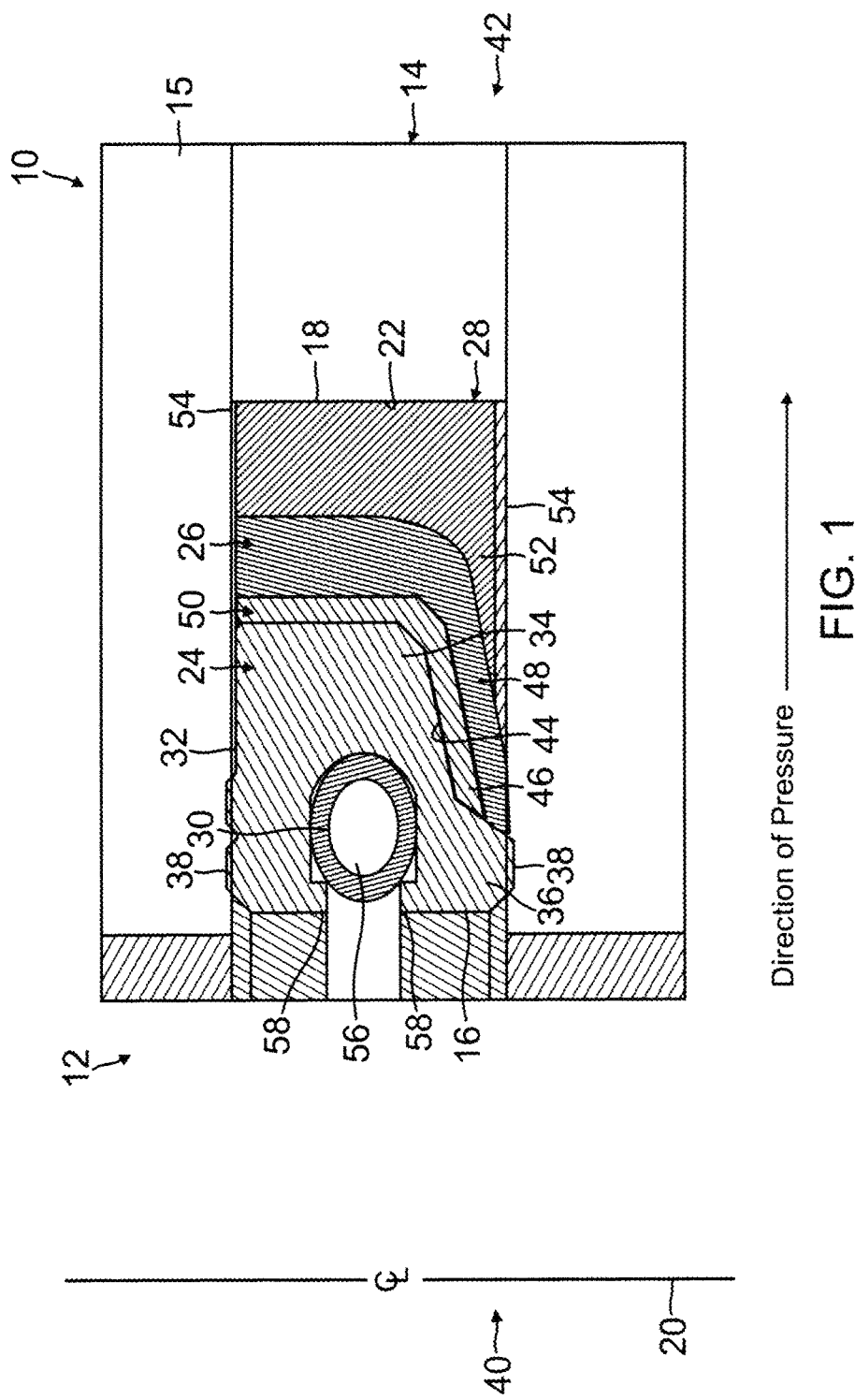
FIG. 1 is a cross-sectional side view of a seal assembly.

With reference now to FIG. 1, there is shown a cross-sectional side view of a seal assembly 10 mounted in a gland, stuffing box, or sealing cavity 12 of a rotating, oscillating, or static equipment, such as a pump, compressor, turbine, gear box, pipe flange, or engine. The seal assembly 10 is mounted to an equipment housing 14, which, as non-limiting examples, may be a seal box or a flange groove joining two piping sections together, and is preferably stationarily positioned relative to the equipment housing. A flange or end plate 15 is used to secure the seal assembly in place inside the groove of the equipment housing. The seal assembly 10 is generally circular in nature and comprises an inside diameter 16 designed to face the fluid to be sealed, which is shown schematically with a centerline ₵ and may represent, for example, a pipe under high temperature and pressure, and an outside diameter 18 in static communication with an internal bore 22 of the equipment housing 14. Known interference requirements between the seal and the equipment housing 14 may be used to implement the preferred seal assembly.

In the embodiment shown, the seal assembly 10 is formed of several distinct components, namely a seal ring 24, a rigid hoop ring 50, a first backing ring 26, a second or secondary backing ring 28, and a energizer 30, which may be a compressible resilient member, a canted-coil spring, cantilever vee spring, or an O-ring (not shown) of suitable resilient characteristics to provide a biasing force, as further discussed below. In the specific embodiment shown, the energizer 30 is a canted coil spring configured to change the resilient characteristic of the seal ring 24, as further discussed below. In the preferred assembly, the seal ring 24 comprises a first outside flange 32, a center channel section 34, and a second outside flange 36. The seal ring 24 is preferably made from a polymer material, which in one embodiment is a PTFE material. Other polymer and PTFE-based composite materials may be used as sealing components of the assembly, such as ultra high molecular weight polyethylene (UHMWPE). Both outside flanges 32, 36 extend axially from the center channel section 34 and terminate in a generally linear lip 38. The lips 38 are compressed by both the equipment housing 14 and the end plate 15 and are opposed outwardly by the biasing force of the energizer 30 so that a seal is formed to seal the seams of the seal box between the high pressure region 38 and the low pressure region 40. In a less preferred embodiment, the lips 38 make a single point contact with the equipment housing. Exemplary O-rings or energizers are disclosed in U.S. Pat. Nos. 4,893,795; 4,974,821; 5,108,078; 5,139,276; and 7,175,441, the contents of each of which are expressly incorporated herein by reference.

In one exemplary embodiment, the second outer flange 36 of the seal ring 24 incorporates a recessed side wall 44 configured for snap-fit arrangement with the rigid hoop ring 50 and the two backing rings 26, 28. The recessed spaced of the recessed side wall 44 is sized and shaped to accommodate the cone sections 46, 48, 52 of the three rings 50, 26, 28, respectively. The mated assembly should be formed so that only the two lips 38 of the two exterior sides 54 project further radially outwardly than the remaining sides to ensure compression at the lips 38 by the end plate 15 and the equipment housing 14. Alternatively or in addition thereto, the various rings 50, 26, 28 may be bonded to one another and to the seal ring 24 to ensure a fixed relative orientation between the various components. In the embodiment shown, the backing rings 26, 28 are made from a PEEK or a PEEK composite material. More preferably, the second backing ring 28 is made from a higher modulus material than the inside backing ring 26 to provide improved performance under certain conditions, such as elevated temperatures. The rigid characteristics of the two support rings 26, 28 allow the first backing ring 26 and the second backing ring 28 to resist pressure force from the higher pressure region 40 that would tend to push the seal ring 24 outwardly to the lower pressure region 42. Thus, the backing rings 26, 28 act to resist distortion, cold flow or creep that may otherwise be experience by the seal ring 24. In an alternative embodiment, the backing rings 26, 28 may be made from a suitably stiff strong material such as stainless steel, ferrous or non-ferrous metals, or engineering plastics.

In one embodiment, the tapered cone section 62 (FIG. 2) of the rigid hoop ring 50 is in direct contact with the seal ring to provide shrink resistance due to thermal cycling. As shown, the first backing ring 26 is also in direct contact with the seal ring 24 to prevent creep or extrusion of the seal ring along the pressure direction.

The seal ring 24 has a holding cavity or bore 56 for capturing the energizer 30, which in the embodiment shown is a canted-coil spring 30, for example a radial or axial canted coil spring. The holding bore has a contour that is defined, at least in part, by geometry of the interior surface of the holding bore, which may be altered to create different holding space for the energizer 30. Using the physical contour of the holding bore to modify the spring deflection will in turn allow the radial force acting on the sealing lips 38 to be adjusted upwardly or downwardly. The holding bore 56 further has two retaining lips 58 having a gap therebetween for placement of the energizer 30 into the holding bore.

Figure 2:
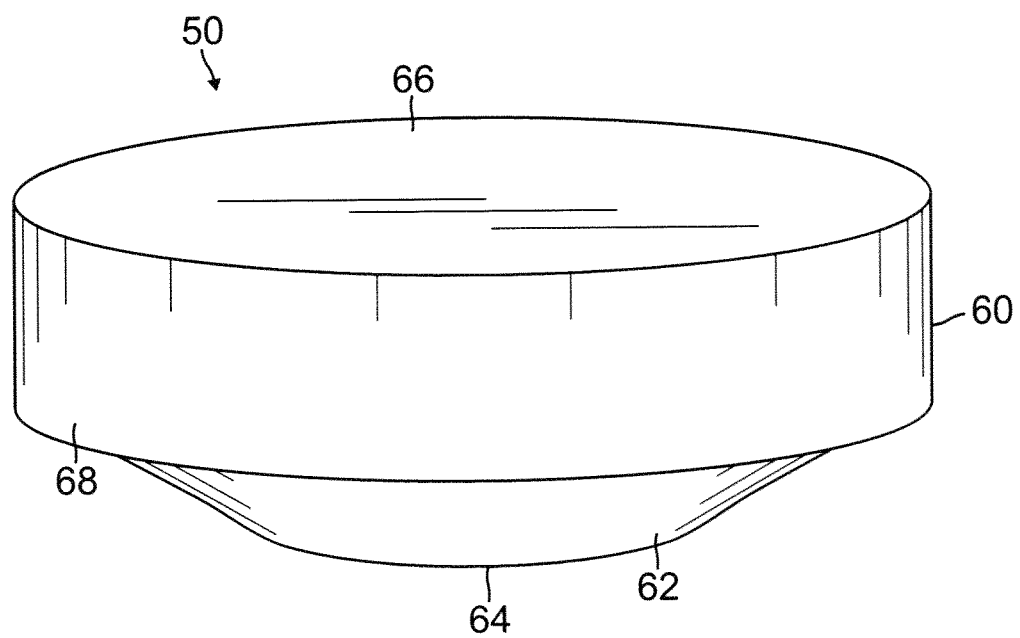
FIG. 2 is a schematic perspective view of a rigid hoop ring.

Refer now to FIG. 2, a schematic view of the rigid hoop ring 50 of FIG. 1 is shown. In an embodiment, the rigid hoop ring 50 comprises a base 60 and a tapered cone section 62 comprising an opening 64. With reference also to FIG. 1, the upper or first side 66 of the rigid hoop ring 50 is configured to mate directly against the seal ring 24 while the lower or second side 68 is configured to mate against the first backing ring 26. The base 60 and the tapered cone section 62 are sized and dimensioned appropriately so as to form one of the snap-fit seal components of the seal assembly 10. Due to its stronger tensile strength characteristic, the base 60 is significantly thinner than the corresponding base of the first backing and/or the second backing ring. In one embodiment, the rigid hoop ring 50 is singularly formed by molding, extrusion, or machining. As the rigid hoop ring provides backing support for the seal ring, it may also be referred to as a rigid hoop backing ring or simply backing ring 50.

In an embodiment, the rigid hoop backing ring 50 is made from a rigid metal or composite material. Preferably, the hoop ring is suitably stiff and strong such as stainless steel, ferrous or non-ferrous metals, or metal alloys. In a particular embodiment, the rigid hoop ring 50 has a higher tensile strength than the seal ring and therefore helps the seal ring to resist shrinkage due to thermal cycling. The tensile strength of the hoop ring 50 is preferably also higher than the two backing rings 26, 28. In alternative embodiments, the hoop ring 50 has the same or less tensile strength as the backing rings 26, 28 but contribute to the overall strength when compared to similar seal assemblies without a hoop ring. Thus, by incorporating the hoop ring 50, the seal assembly 10 of FIG. 1 is understood to be one that is capable of minimizing the transfer of load and stresses from the seal ring 24 to the outer materials, such as the backing rings 26, 28, as compared to the same seal assembly not incorporating a rigid hoop ring. The seal assembly may also be understood as having multiple backing rings for supporting a seal ring and resisting unwanted extrusion of the seal ring in the direction of high pressure to low pressure, said multiple backing rings comprising a backing ring made of a high tensile strength material located between a seal ring and a backing ring. In a particular embodiment, the backing ring made of the high tensile strength material has a base section 60 and a tapered cone section 62 comprising an opening and wherein the base section has a thickness that is less than a corresponding base thickness of the backing ring. In one embodiment, the base thickness of the first backing ring 26 is about 2 to about 5 times thicker than the base thickness of the rigid hoop ring 50 and the base thickness of the second backing ring 28 is about 3-7 times thicker. In yet another embodiment, the backing ring of lower tensile strength material is made of a PEEK or PEEK composite material.

Figure 3:
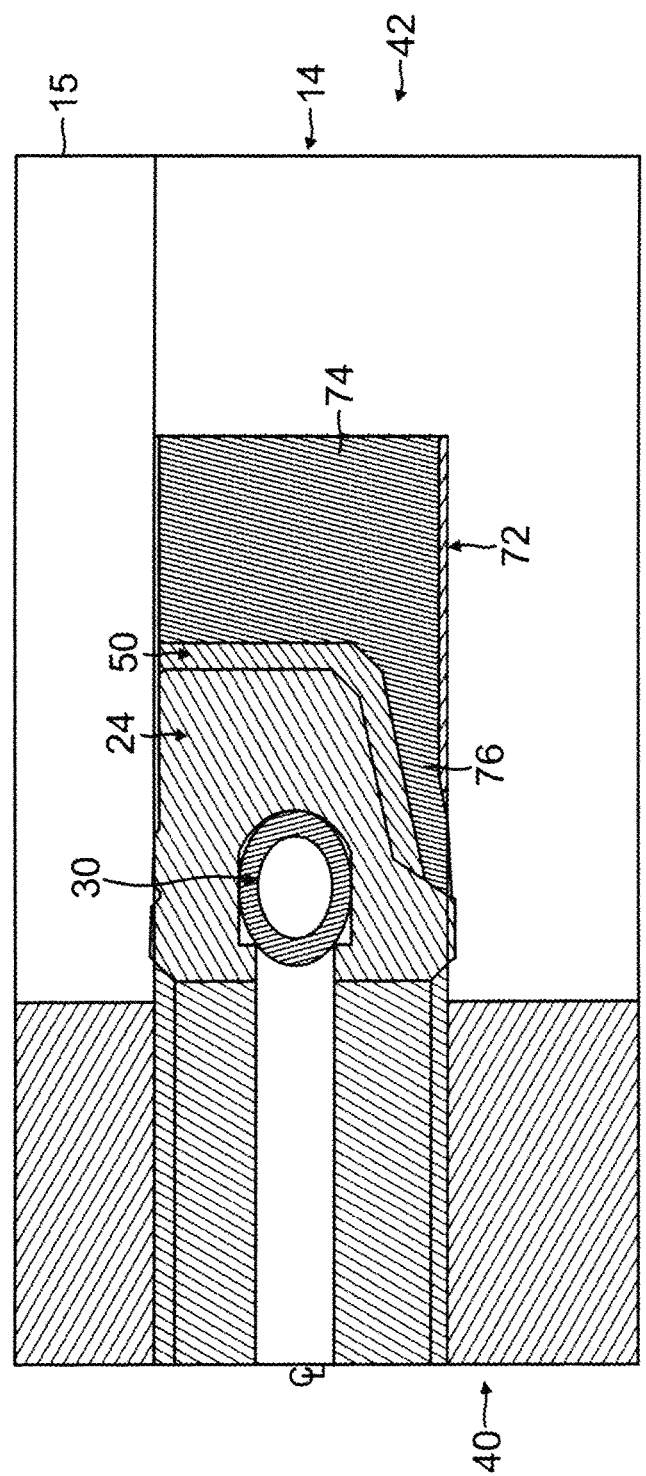
FIG. 3 is across-sectional side view of a seal assembly in accordance with a second example.

FIG. 3 shows across-sectional side view of an alternative seal assembly 70. In one exemplary embodiment, the alternative seal assembly 70 is similar to the seal assembly 10 of FIG. 1 but with a single backing ring 72 instead of two. Thus, the alternative seal assembly 70 is understood to be usable as a face seal and has a seal ring 24, a rigid hoop ring 50, a backing ring 72, and an energizer 30. In the embodiment shown, the backing ring 72 has abuse section 74 and a tapered cone section 76. Because it acts as a single backing ring 72 without a secondary backing ring, the base section 74 of the backing ring 72 preferably has a thickness that is measurably thicker than a corresponding base section thickness of a dual backing ring assembly, as shown in FIG. 1. In one embodiment, the thickness of the base section of the backing ring 72 is at least 2 times thicker than the thickness of the base section of the rigid hoop ring 50. In another embodiment, the thickness is between 2.1 times thicker to 9 times thicker. Most preferably, both the rigid hoop ring 50 and the backing ring 72 directly contact the seal ring 24 to support the seal ring from shrinking due to thermal cycling and from unwanted extrusion due to high temperature and pressure differentials between two different regions of the seal assembly.

The seal assembly 70 may be used as a face seal by locating the same inside a groove of two stationary elements, such as the equipment housing 14 and the end plate 15. The seal assembly 70 is configured to seal the equipment housing no that fluid from the high pressure region 40 does not leak across into the low pressure region 42.

Figure 4:
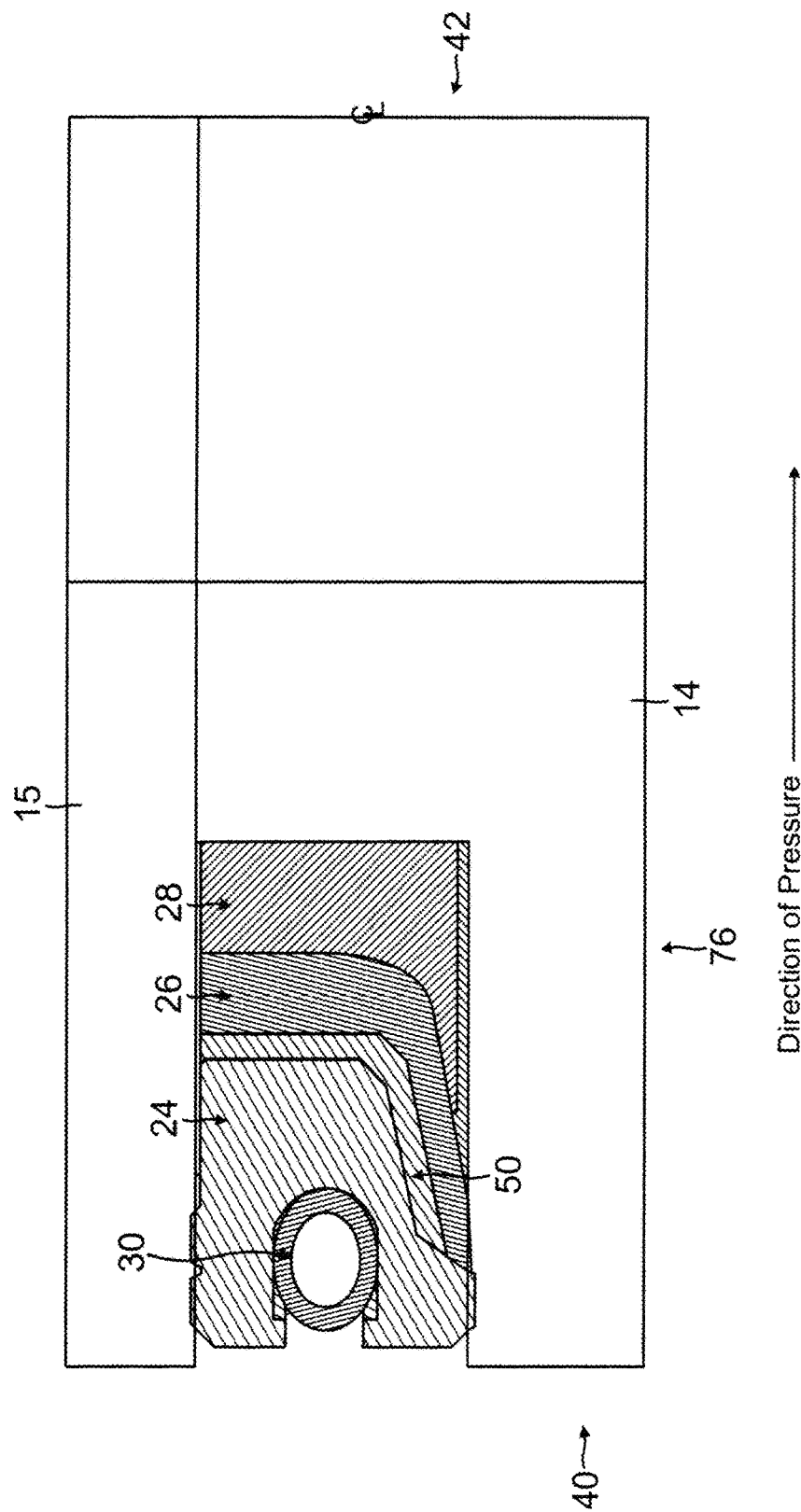
FIG. 4 is a cross-sectional side view of a seal assembly in accordance with a third example.

FIG. 4 is a cross-sectional side view of an alternative seal assembly, which is generally designated as 76. In one embodiment, the seal assembly is similar to the seal assembly shown in FIG. 1 and comprises a seal ring 24 having an energizer 30 disposed in a holding cavity, a rigid hoop ring 50, a first backing ring 26, and a second backing ring 28. The seal assembly 76 is understood as having a similar configuration as the seal assembly of FIG. 1 with the exception of how the assembly is applied. In the present embodiment, the seal assembly 76 is used as an outside face seal in that fluid from the outside high pressure region 40, such as hydrocarbon gas, is prevented from leaking into the housing or pipe, which has a lower pressure region 42, for example of another hydrocarbon gas. The housing, pipe, or shaft is shown schematically with a centerline ₵ and is attached to an equipment housing 14 and end plate 15, such as a pair of mating pipe flanges.

Figure 5:
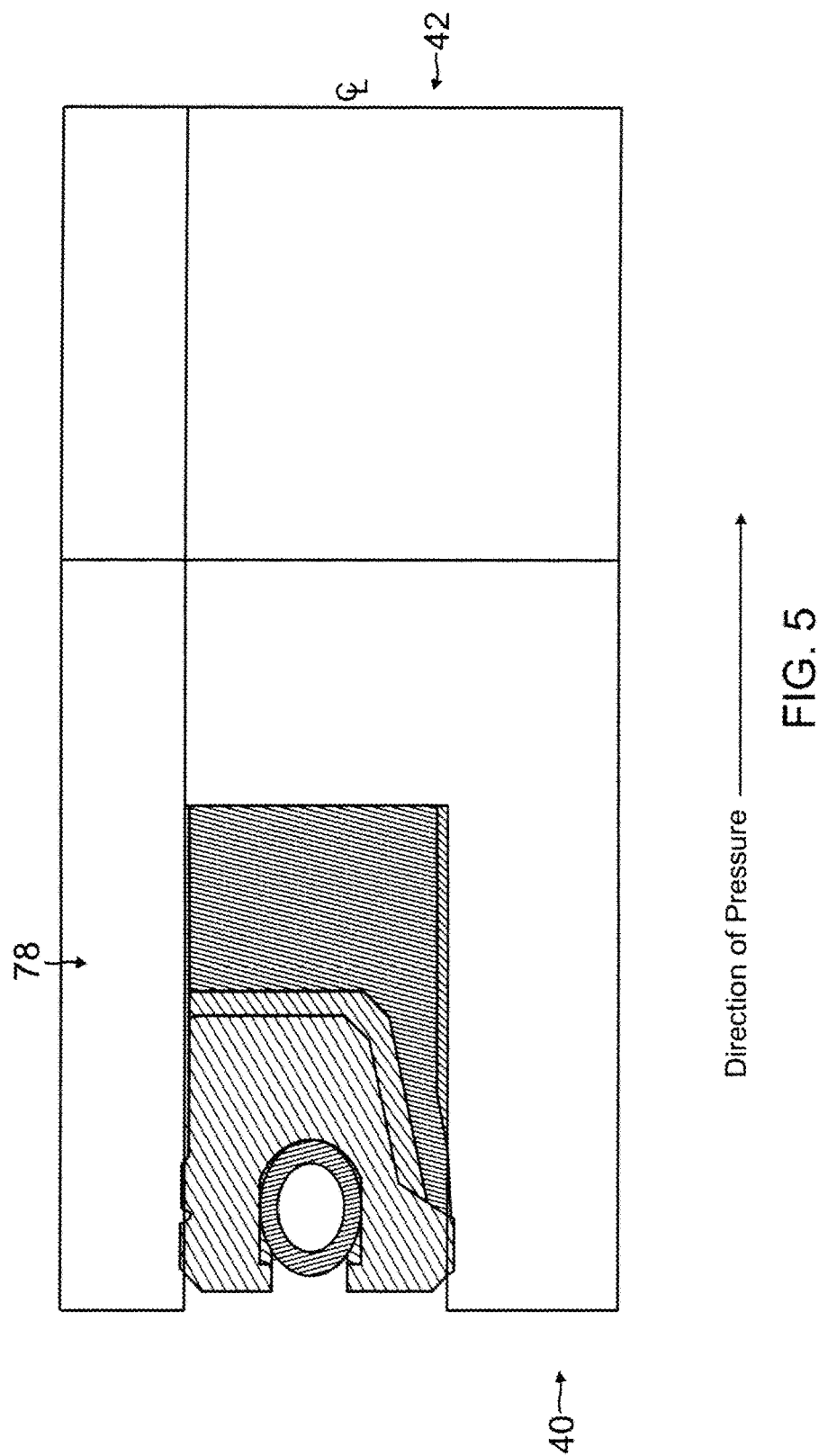
FIG. 5 is a cross-sectional side view of a seal assembly in accordance with a fourth example.

FIG. 5 is across-sectional side view of yet another seal assembly, which is designated generally as 78. The seal assembly is similar to the seal assembly of FIG. 3 but for use as an outside face seal, such as that disclosed with reference to FIG. 4.

Figure 6:
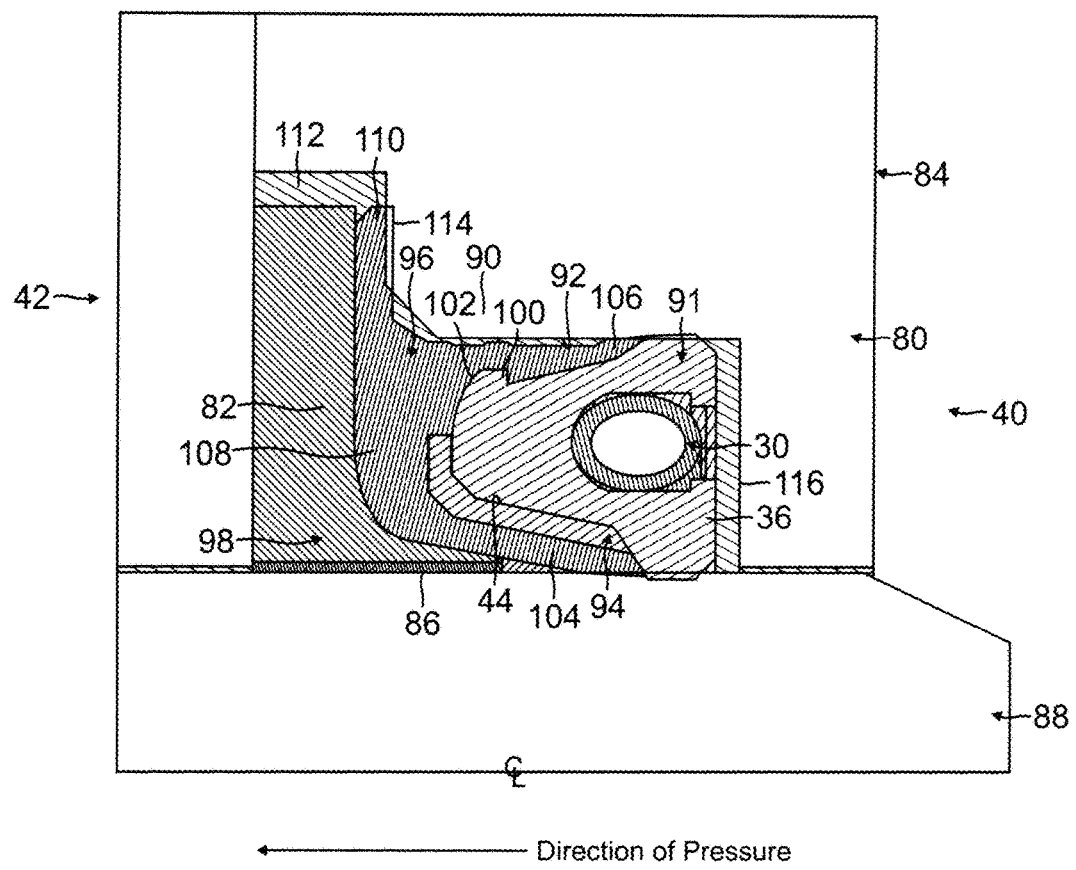
FIG. 6 is a cross-sectional side view of a seal assembly in accordance with a fifth example.

With reference now to FIG. 6, there is shown a cross-sectional side view of a seal assembly 80 mounted in a gland, stuffing box, or sealing cavity 82 of a rotating, oscillating, or static equipment, such as a pump, compressor, turbine, gear box, or engine. In a particular application, the seal assembly 80 is mounted in a roughneck flange or coupling 84 and is preferably stationarily positioned relative to the flange or coupling. The seal assembly is generally circular in nature and comprises an inside diameter 86 in dynamic sealing communication with a shaft 88, shown schematically with a centerline ₵ and may represent, e.g., a pipe. The seal also has a non-uniform or varying outside diameter 90 in static communication with an internal bore 92 of the equipment housing 84. Known interference requirements between the seal and the shaft and between the seal and the equipment housing 84 may be used to implement the preferred seal assembly. Although the seal assembly 80 is described for use in a roughneck flange application, such as for joining two pipes or two sections having offset together, it may be used in a rotating or reciprocating shaft application.

In one embodiment shown, the seal assembly 80 comprises a plurality of distinct components, namely a seal ring 91, a rigid hoop ring 94, a first backing ring 96, a second backing ring 98, and an energizer 30, which may be a resilient member, a canted-coil spring, cantilever vee spring, or an O-ring (not shown) of suitable resilient characteristics to provide a biasing force, as further discussed below. In the specific embodiment shown, the energizer 30 is a canted coil spring. In the preferred assembly, the seal ring 91 is similar to the seal ring 24 shown with reference to FIG. 1 with at least two exceptions. In the present embodiment, the seal ring 91 comprises a projection or bump 100 for mating engagement with a notch or recess 102 formed on the primary backing ring 96. The engagement between the two secures the seal ring 91 to the backing ring 96 in fixed relative orientation. The centerline of the seal assembly has also changed, which changes the direction of the inside and outside diameters of the present seal assembly compared to the seal assembly of FIG. 1.

In one embodiment, the rigid hoop ring 94 is wedged between the seal ring 91 and the first or primary backing ring 96. In a particular embodiment, the rigid hoop ring 94 is wedged between the recessed side wall 44 of the outside flange of the seal ring and the backing ring 96. The two backing rings 96, 98 and the rigid hoop ring 94 support the seal ring 91 from creep and cold flow due to elevated temperatures and differential pressure between the higher pressure region 40 that tends to push the seal ring 26 outwardly towards the lower pressure region 42. Thus, the rigid hoop ring 94 is understood to provide added backing and support to resist distortion, such as shrinkage, compared to similar seal assemblies without a rigid hoop ring. Note also that as the backing ring 96 directly contacts the seal ring, it prevents or reduces the possibility of unwanted extrusion that tends to push the seal ring in the direction of pressure gradient.

In one embodiment, the primary backing ring 96 incorporates a first outside flange 104 and a second outside flange 106 having a recess 102 formed thereon. The two outside flanges 104, 106 support corresponding outside flanges of the seal ring 91 from distortion. However, as the rigid hoop ring 94 contacts a part of the center channel flange and the exterior flange 36 with the recessed side wall 44 but not the other exterior flange, the seal ring 91 has a non-uniform backing configuration. More specifically, the seal ring 91 comprises two outside flanges and wherein a first outside flange is configured for mating against a shaft or pipe and has a backing support structure comprising at least one backing ring and one rigid hoop ring with enhanced back support that is more resistant to distortion and creep than the other outside flange.

The present seal assembly 80 is further understood to comprise a seal ring having a holding bore and a rigid hoop ring 94 positioned between two outside flanges 104, 106 and a center channel flange of a backing ring 96. In one specific embodiment, the rigid hoop ring 94 is located against a recessed side wall 44 of an outside flange 36 of the seal ring. The seal assembly is further understood to comprise a backing ring that fully circumscribes a rigid hoop ring. Although the rigid hoop ring forms a line contact with the backing ring, in one embodiment, detents or undercuts may be incorporated to inter-engage the two to fix them in relative orientation.

In one embodiment, a center channel extension 110 extends from the center channel flange 108. The second backing flange 98 has a similar extension that together with the extension 110 of the first backing flange occupy the enlarged bore section 112 of the equipment housing. To ensure adequate or proper axial positioning of the seal assembly 80 within the stuffing box 82, an extension shim 114 and a seal shim 116 may be incorporated.

Figure 7:
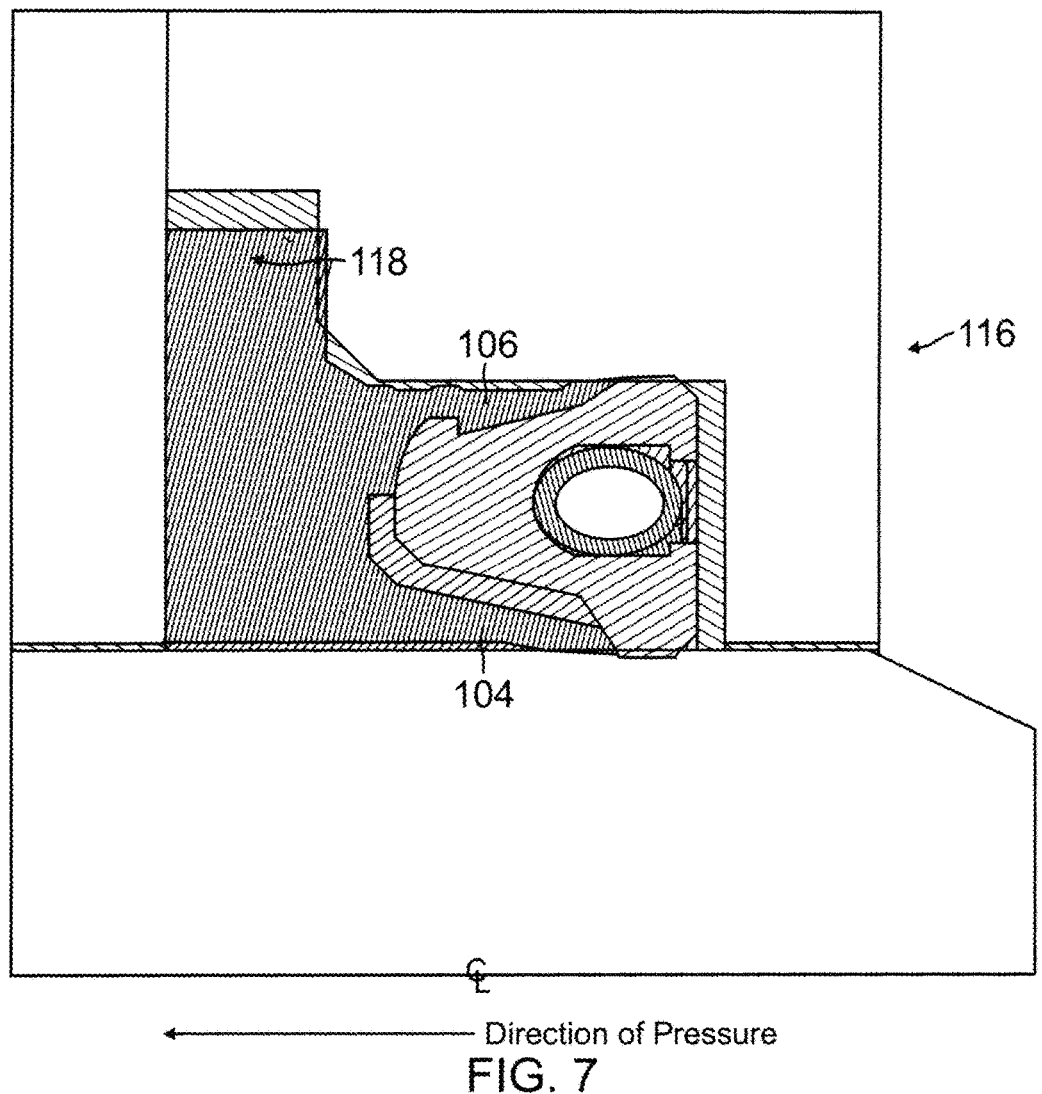
FIG. 7 is a cross-sectional side view of a seal assembly in accordance with a sixth example.

FIG. 7 is a cross-sectional side view of an alternative seal assembly, which is generally designated 116. In one embodiment, the seal assembly 116 is similar to the seal assembly 80 of FIG. 6 with at least one exception. In the present embodiment, a single backing ring 118 having two outside flanges 104, 106 is incorporated. The single backing ring 118 has a center channel section having a thickness that is roughly the thickness of the two center channel sections of the two backing rings of FIG. 6.

Figure 8:
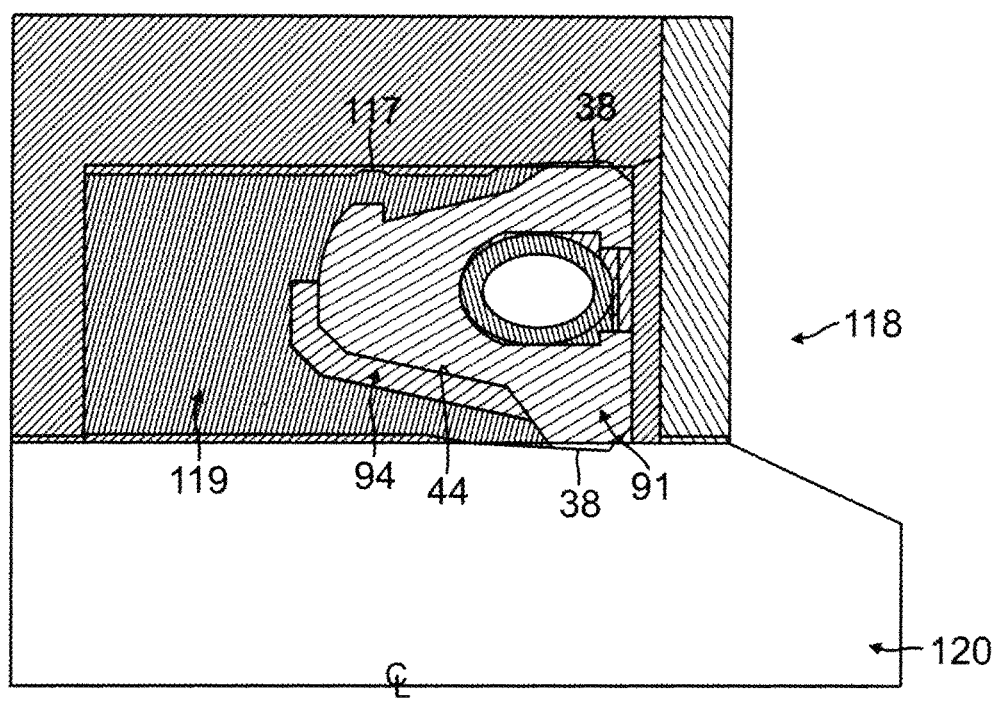
FIG. 8 is a cross-sectional view of seal assembly in accordance with a seventh example.

FIG. 8 is a cross-sectional side view of still yet another seal assembly, which is generally designated 118. In one embodiment, the seal assembly 118 is similar to the seal assembly 116 of FIG. 7 but with at least two differences, namely it does not have a center channel extension and its use with reciprocating shaft 120, applications Thus, an example is understood to include a seal assembly having a first outside flange having a sealing lip 38 for mating with a stationary equipment housing and a second outside flange having a sealing lip 38 for dynamic mating with a reciprocating shaft 120. In a specific embodiment, a rigid hoop ring 94 is incorporated for reinforcing a recessed side wall 44 of the seal ring 91. The seal assembly is understood to include rings configured to prevent distortion, creep, shrinkage, and unwanted extrusion of the seal ring that is incrementally better than similar seal assemblies without a rigid hoop ring. In another specific embodiment, the backing ring 119 is singularly formed from a rigid material, such as from a PEEK or a PEEK composite material, having a center channel section having a thickness that is at least 3 times thicker than the thickness of the base section of the rigid hoop ring 94. More preferably, the thickness is about 6 times to about 12 times thicker. A groove or bump 117 may be incorporated to facilitate alignment of the seal assembly 118 in the stuffing box.

Figure 9:
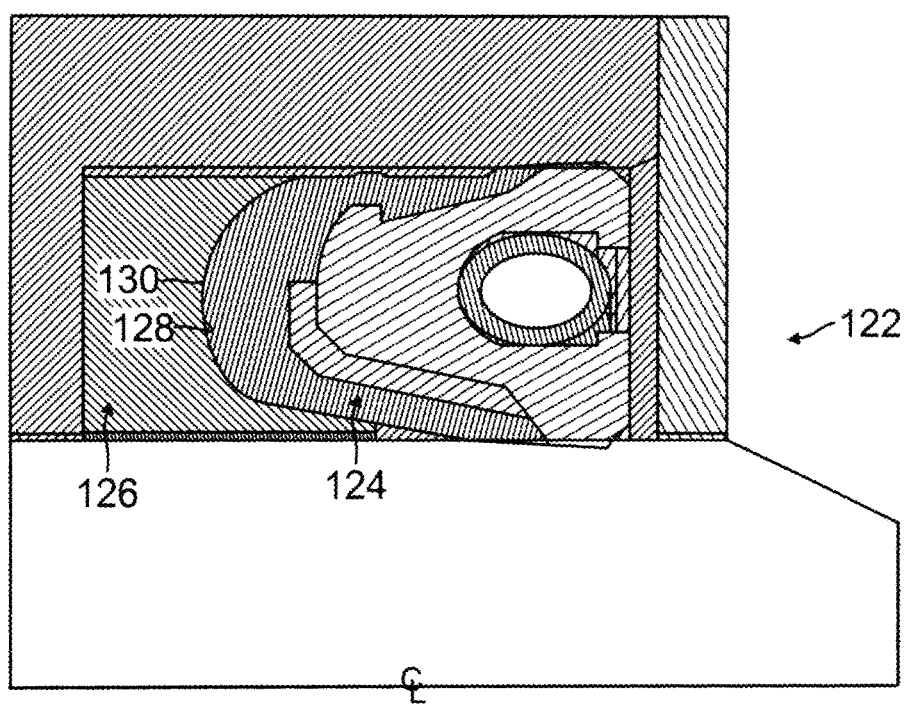
FIG. 9 is a cross-sectional view of seal assembly in accordance with an eight example.

FIG. 9 is a cross-sectional side view of still yet another seal assembly 122. The present seal assembly 122 is similar to the seal assembly 116 of FIG. 8 with at least one exception. In the present embodiment, two backing rings 124, 126 are incorporated with the first backing ring 124 having an arcuate back wall 128 for mating with a concave center wall 130 of the second backing ring 126. The various components may snap-fit together and may optionally be bonded together.

Figure 10:
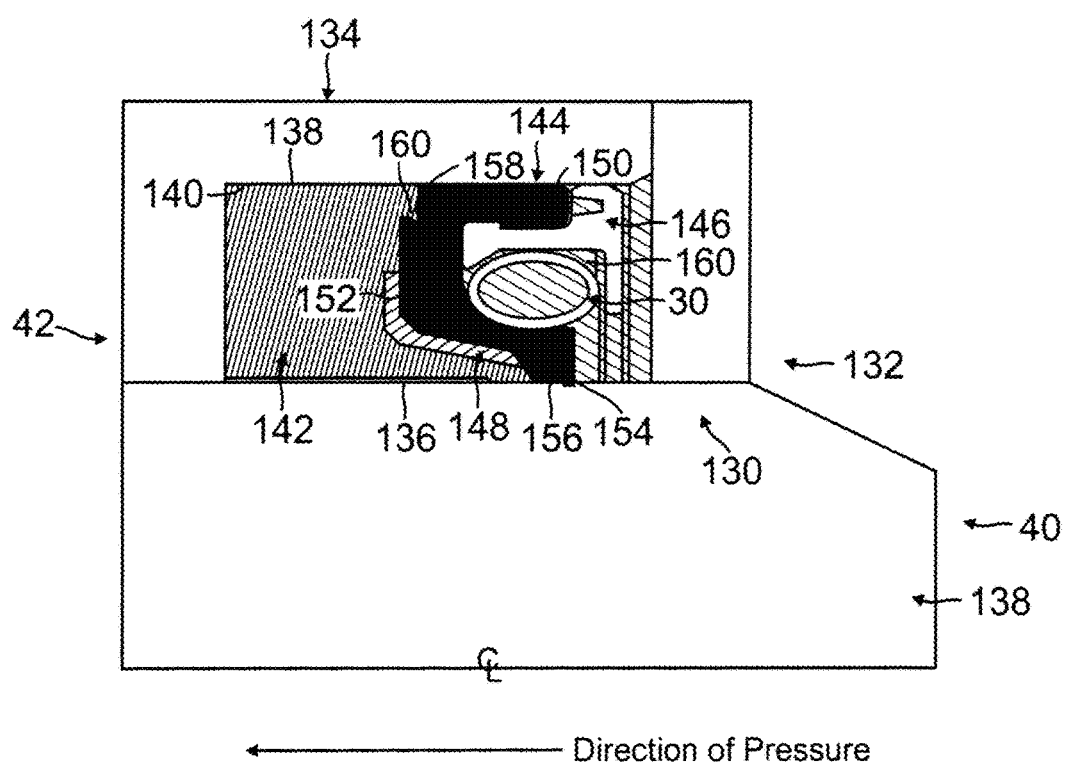
FIG. 10 is across-sectional view of seal assembly in accordance with a ninth example.

With reference now to FIG. 10, there is shown a cross-sectional side view of a seal assembly 130 mounted in a gland, stuffing box, or sealing cavity 132 of a rotating equipment, such as a pump, compressor, turbine, gear box, or engine. The seal assembly 130 is mounted to a gland or equipment housing 134 and is preferably stationarily positioned relative to the housing. The seal assembly 130 is generally circular in nature and comprises an inside diameter 136 in dynamic sealing communication with a shaft 138 and an outside diameter 138 in static communication with an internal bore 140 of the housing 134. Known interference requirements between the seal and the shaft and between the seal and the housing may be used to implement the preferred seal assembly.

In the embodiment shown, the seal assembly 130 is formed of several components, including a backing ring 142, a seal ring 144, an inner retaining ring 146, and an energizer 30. In one embodiment, a rigid hoop ring 148 is incorporated between the seal ring 144 and the backing ring 142. In the preferred assembly, the seal ring 144 comprises an outside flange 150, a center channel section 152, and an inside flange 154 and is made from a polymer material, which in one embodiment is a PTFE material. The inside flange 154 extends axially internally from the center channel section 152 and terminates in a generally linear lip 156. The lip 156 is in dynamic contact with the shaft 138, in a cross-sectional view, along a straight line. In a less preferred embodiment, the lip 156 makes a single point contact with the shaft.

In one exemplary embodiment, the inside flange 154 further incorporates at least one notch or recess 158 formed along an external surface for mating with corresponding bumps or projections 160 formed on the backing ring 142. The engagement between the two secures the seal ring 144 to the backing ring 142 in fixed relative orientation. In the embodiment shown, the backing ring 142 is made from a PEEK or a PEEK composite material. Its rigid characteristic allows the backing and support ring to resist pressure force from a higher pressure region 40 that would tend to push or extrude the seal ring 26 outwardly to a lower pressure region 42. Thus, the backing and support ring 142 acts to resist distortion of the seal ring. In an alternative embodiment, the backing ring 142 may be made from a suitably stiff strong material such as stainless steel, ferrous or non-ferrous metals, or engineering plastics. The backing ring 142 therefore contacts, directly or indirectly, the seal ring to support the seal ring.

Also shown is a rigid hoop ring 148 incorporated to further reinforce the seal ring 144. The rigid hoop ring 148 is preferably positioned next to the seal ring 144 and most preferably is located between the backing ring 142 and the seal ring 144. The rigid hoop ring 148 further supports the inside flange 154 from shrinkage and directly contacts the flange of the seal ring. Thus, the present seal assembly is understood to provide greater resistant to shrinkage and unwanted extrusion, among other things, to the seal ring than a similar seal assembly without a rigid hoop ring.

The inner retaining ring 148 is configured to mate with the outside flange 150 of the seal ring 144. In one exemplary embodiment, a snap fit arrangement is provided to engage the two, which when assembled, create a holding bore 160 for capturing the energizer 30. The energizer 30 may be a radial or axial canted coil spring and the surfaces of the inner retaining ring 146 and the seal ring 144 define the holding bore 160. The holding bore therefore has a contour that is defined, at least in part, by the inner retaining ring and the seal ring, which may be altered to create different holding space for the energizer 30. Using the physical contour of the holding bore to modify the spring deflection will in turn allow the radial force acting on the sealing lip 156 to be adjusted upwardly or downwardly. The inner retaining ring 148 may be made from a metal material or other high modulus materials.

Figure 11:
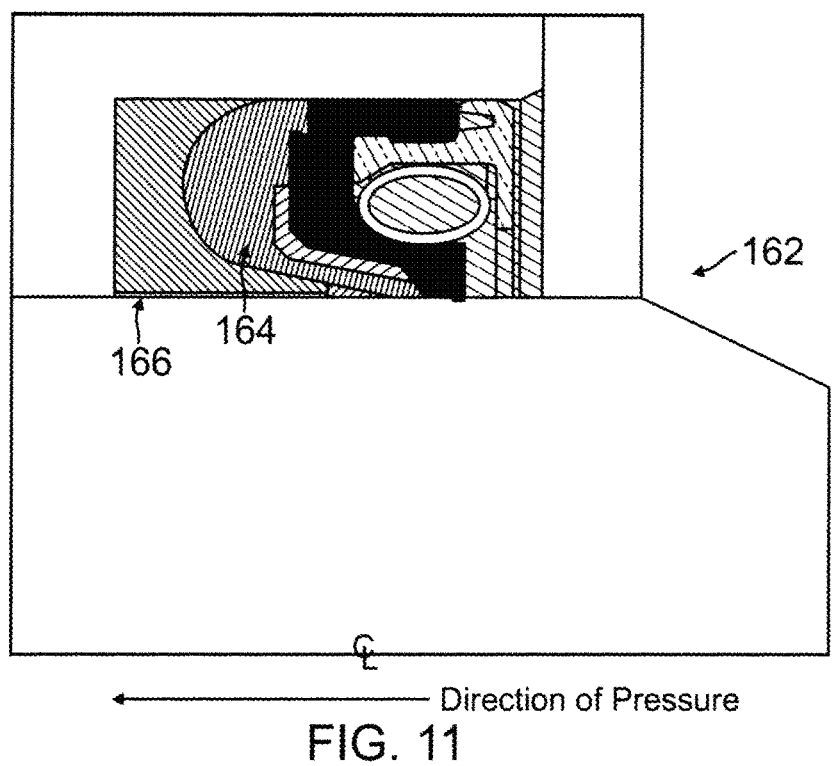
FIG. 11 is a cross-sectional view of seal assembly in accordance with a tenth example.

FIG. 11 is across-sectional side view of yet another seal assembly, which is generally designated 162. The present seal assembly 162 is similar to the seal assembly 130 of FIG. 10 with at least one exception. In the present embodiment, two backing rings are utilized 164, 166 instead of one, similar to the assembly of FIG. 9.

FIG. 12 is across-sectional side view of another example of a seal assembly 168. In the embodiment shown, the seal assembly does not incorporate a rigid hoop ring but only a single backing ring made of PEEK or PEEK composite material having sufficient center channel thickness and outside channel flange thickness to support the seal ring. The seal assembly may be used as an inside face seal as previously discussed with reference to FIG. 3.

Figure 13:
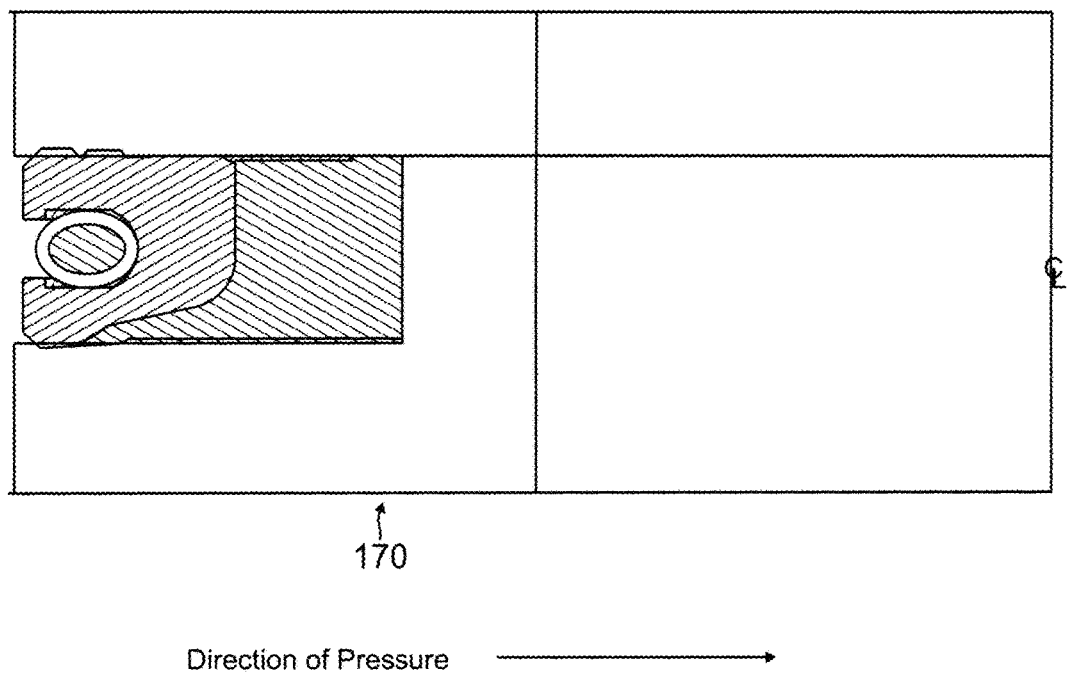
FIG. 13 is a cross-sectional view of seal assembly in accordance with a twelfth example.

FIG. 13 depicts yet another seal assembly 170, which is similar to the seal assembly of FIG. 12. However, in the present embodiment, the seal assembly 170 is applied as an outside face seal similar to the seal assembly shown and discussed with reference to FIG. 4.

In certain embodiments, instead of using a PEEK or PEEK composite material to form a backing ring, an engineering plastic material may be used. Exemplary engineering plastics include Ultem® (PEI) amorphous polyetherimide polyethersulfone (PES), semi-crystalline polyphenylsulfide (PPS), semi-crystalline polyphthalamide (PPA), among others. Fibers Filler additives may be added to the alternative material to enhance their properties.

Thus, an aspect of the present example is understood to include a seal assembly comprising a seal ring made of a first material, a first backing ring made of a second high tensile strength material having abuse section of a first thickness, and a second backing ring made of a third high tensile strength material having a base of a second thickness, and wherein the first and the second backing rings both contact the seal ring. In one particular embodiment, the second thickness is at least three times thicker than the first thickness. In another particular embodiment, the seal ring includes a holding bore sized to accommodate an energizer, which in particular embodiments may include a canted coil spring or an O-ring.

The seal assembly of the present example is further understood to include a seal ring having an inside retaining lip that defines an inside diameter, a first backing ring made of a high tensile strength material in direct contact with the seal ring, and a second backing ring made of a high tensile strength material surrounding, at least in part, the first backing ring and the seal ring, and wherein an exterior wall surface of the second backing ring define an outside diameter. In one embodiment, the materials of the first backing ring and of the second backing ring are different. In one particular embodiment, the first backing ring is made from a metal material and the second backing ring is made from a PEEK or PEEK composite material or alternatively a conventional engineered plastic.

Although limited embodiments of seal assemblies and their components have been specifically described and illustrated herein, many modifications and variations will be apparent to those skilled in the art. For example, a different combination of pliable seal ring plastic material and rigid plastic housing structure may be used instead of PTFE and PEEK. Furthermore, it is understood and contemplated that features specifically discussed for one seal embodiment may be adopted for inclusion with another seal embodiment, provided the functions are compatible. The present invention further includes methods for forming the seal assemblies as described. Accordingly, it is to be understood that the seal assemblies and their components constructed according to principles of this invention may be embodied other than as specifically described herein. For example, with reference to FIG. 1, the rigid hoop ring 50 may incorporate a rearwardly facing pin that fits into a bore formed on the first backing ring 26 to retain the two in fixed relative orientation. As additional examples, the rigid hoop ring may include a broached or knurled edge or a stepped lip that interlock with the adjacent backing ring. The invention is also defined in the following claims.

What is claimed is:

1. A method of making a seal assembly having shrink resistant support, said method comprising:
   providing a seal ring comprising a holding bore defined at least in part by an outside flange and an inside flange having a seal lip with an inside diameter;
   placing a first backing ring made from a high tensile strength material adjacent the seal ring and in contact with the seal ring, said first backing ring having a base section having a first thickness and an inside flange projecting in a same direction as the seal lip and in contact with at least part of the inside flange of the seal ring;
   placing a second backing ring comprising a base section having a second thickness and an inside flange projecting in the same direction as the seal lip in contact with both the first backing ring and the seal ring so that the second backing ring, which is made from a high tensile strength material, contacts and supports the first backing ring at the base section and the inside flange of the first backing ring; and
   wherein the second thickness is at least three times thicker than the first thickness to provide shrink resistance support for the seal ring.

2. The method of claim 1, wherein the first backing ring and the second backing ring are mechanically coupled to one another.

3. A method of making a seal assembly having shrink resistant support, said method comprising:
   providing a seal ring comprising a holding bore defined at least in part by an outside flange and an inside flange having a seal lip with an inside diameter;
   placing a first backing ring made from a high tensile strength material adjacent the seal ring and in contact with the seal ring, said first backing ring having a base section having a first thickness and an inside flange projecting in a same direction as the seal lip and contacting at least a portion of the inside flange of the seal ring having the seal lip;
   placing a second backing ring adjacent to and in contact with the base section and the inside flange of the first backing ring; said second backing ring comprising a base section having a second thickness and an inside flange in contact with the inside flange of the first backing ring and projecting in the same direction as the seal lip;
   placing a rigid hoop ring made from a metallic material between the first backing ring and the seal ring; said rigid hoop ring having a tapered cone section in contact with the seal ring and extending in the same direction as the seal lip; and wherein the second thickness is at least three times thicker than the first thickness.

4. The method of claim 1, further comprising placing an energizer into the holding bore so that the energizer biases against both the outside flange and the inside flange of the seal ring.

5. The method of claim 4, wherein the energizer is an O-ring or a spring or a canted coil spring.

6. A seal assembly comprising a rigid backing ring made of a first material having an axially extending flange; a seal ring comprising an outside flange for mating contact with a seal housing and an inside flange defining a seal lip positioned next to the backing ring and in mechanical engagement with the backing ring, a rigid hoop ring positioned at least in part between the backing ring and the seal ring; said rigid hoop ring in contact with both the seal ring and the backing ring and comprises a base having a tapered cone section extending from the base that forms a line contact with the seal ring; wherein the axially extending flange of the backing ring contacts, at least in part, the inside flange of the seal ring having the seal lip; and wherein the mechanical engagement comprises a bump engaging a notch.

7. The seal assembly of claim 6, wherein the rigid hoop ring is made from a high modulus metal or a composite material.

8. The seal assembly of claim 7, wherein the metal is a stainless steel, a ferrous metal or a non-ferrous metal.

9. The seal assembly of claim 6, wherein the outside flange and the inside flange of the seal ring are separated from one another by a center channel section.

10. The seal assembly of claim 6, further comprising an energizer positioned inside a holding bore defined by the seal ring.

11. The seal assembly of claim 10, wherein the energizer is at least one of a canted-coil spring, a ribbon spring and an elastomer.

12. The seal assembly of claim 6, wherein the seal ring is made from a polymer material or an elastomer.

13. The seal assembly of claim 6, further comprising a second backing ring in contact with the backing ring.

14. The seal assembly of claim 6, wherein the backing ring is made from a high modulus and high temperature resistant polymer material, a ferrous metal, or a non-ferrous metal.

15. A seal assembly for sealing engagement with a shaft comprising:

a seal ring comprising an outside flange, an inside flange having a seal lip, a center channel section, and a holding bore defined at least in part by the inside flange and the outside flange;

a backing ring in adjacent contact with the center channel section and having a flange extending co-axially with the inside flange of the seal ring and contacting the inside flange having the seal lip;

wherein the seal lip of the seal ring comprises an arcuate section overlapping and contacting an end edge of the flange of the backing ring; and wherein a metal rigid hoop ring is located between the seal ring and the backing ring and comprises an end edge in contact with the arcuate section of the seal lip.

16. The seal assembly of claim 15, further comprising a second backing ring in contact with the backing ring.

17. The seal assembly of claim 15, further comprising a canted coil spring positioned inside the holding bore and biasing both the inside flange and the outside flange.

18. The seal assembly of claim 15, wherein the seal ring and the backing ring are in mechanical engagement.

19. The seal assembly of claim 15, wherein the rigid hoop ring is made from a high modulus metal or a composite material.

20. The method of claim 1, further comprising placing a rigid hoop ring made from a metallic material between the first backing ring and the seal ring; said rigid hoop ring having a tapered cone section in contact with the seal ring and extending in the same direction as the seal lip.

21. The method of claim 3, wherein the second backing ring contacts the seal ring.

22. The method of claim 3, wherein the first backing ring and the second backing ring are mechanically coupled to one another.

23. The method of claim 3, wherein the tapered cone section has a tapered end edge.

24. The method of claim 3, further comprising placing an energizer into the holding bore so that the energizer biases against both the outside flange and the inside flange of the seal ring.

25. The method of claim 24; wherein the energizer is an O-ring or a spring or a canted coil spring.

26. The method of claim 1, wherein the first and second backing rings contact the seal ring adjacent the seal lip of the seal ring.

27. The method of claim 1 wherein the seal ring further comprises a cavity, and an energizer located in the cavity, the energizer biasing the lip seal onto the shaft.

* * * * *

UNITED STATES PATENT AND TRADEMARK OFFICE
CERTIFICATE OF CORRECTION

PATENT NO. : 10,247,307 B2
APPLICATION NO. : 12/727401
DATED : April 2, 2019
INVENTOR(S) : Mike Foster Page 1 of 1

It is certified that error appears in the above-identified patent and that said Letters Patent is hereby corrected as shown below:

In the Specification

In Column 2, Line 29, delete "across-sectional" and insert -- a cross-sectional --, therefor.

In Column 2, Line 43, delete "across-sectional" and insert -- a cross-sectional --, therefor.

In Column 5, Line 17, delete "across-sectional" and insert -- a cross-sectional --, therefor.

In Column 5, Line 44, delete "no" and insert -- so --, therefor.

In Column 5, Line 63, delete "across-sectional" and insert -- a cross-sectional --, therefor.

In Column 9, Line 9, delete "across-sectional" and insert -- a cross-sectional --, therefor.

In Column 9, Line 15, delete "across-sectional" and insert -- a cross-sectional --, therefor.

Signed and Sealed this
Twenty-second Day of October, 2019

Andrei Iancu
*Director of the United States Patent and Trademark Office*